(12) United States Patent
Maier et al.

(10) Patent No.: US 7,637,020 B2
(45) Date of Patent: Dec. 29, 2009

(54) ROTATION ANGLE SENSOR AND METHOD FOR DETERMINING THE ABSOLUTE ANGULAR POSITION OF A BODY UNDERGOES SEVERAL ROTATIONS

(75) Inventors: Oliver Maier, Attendorn (DE); Christian Schirp, Witten (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 141 days.

(21) Appl. No.: 12/072,756

(22) Filed: Feb. 28, 2008

(65) Prior Publication Data
US 2008/0148580 A1 Jun. 26, 2008

Related U.S. Application Data

(63) Continuation-in-part of application No. PCT/EP2007/001126, filed on Feb. 9, 2007.

(30) Foreign Application Priority Data
Feb. 11, 2006 (DE) .................. 10 2006 006 359

(51) Int. Cl.
*G01B 7/30* (2006.01)
(52) U.S. Cl. ...................................... 33/1 PT
(58) Field of Classification Search ............... 33/1 PT
See application file for complete search history.

(56) References Cited

U.S. PATENT DOCUMENTS

| | | | |
|---|---|---|---|
| 5,930,905 A | 8/1999 | Zabler et al. | |
| 6,507,188 B1 * | 1/2003 | Dilger et al. | 324/207.25 |
| 6,618,688 B2 * | 9/2003 | Schodlbauer | 702/151 |
| 6,745,116 B2 | 6/2004 | Takuma et al. | |
| 6,804,888 B2 * | 10/2004 | Nishikawa et al. | 33/1 PT |
| 6,848,187 B2 | 2/2005 | Ito et al. | |
| 6,861,837 B1 * | 3/2005 | Shimizu et al. | 324/207.25 |
| 6,912,791 B2 * | 7/2005 | Tateishi et al. | 33/1 PT |
| 7,040,025 B2 * | 5/2006 | Inoue | 33/1 PT |
| 7,215,114 B2 | 5/2007 | Takuma | |
| 7,258,027 B2 | 8/2007 | Oike et al. | |
| 7,532,005 B2 * | 5/2009 | Arakawa et al. | 324/207.25 |

(Continued)

FOREIGN PATENT DOCUMENTS

DE 198 21 467 A1 11/1999

(Continued)

*Primary Examiner*—Christopher W Fulton
(74) *Attorney, Agent, or Firm*—Brooks Kushman P.C.

(57) ABSTRACT

A sensor determines the absolute angular position of a body that can rotate through rotations. The sensor includes two code wheels which rotate as the body rotates. The code wheels are driven at a different gear ratio such that the code wheels rotate faster than the body and the code wheels rotate at different rates. Two sensor elements respectively determine the rotational angle positions of the code wheels. The difference between the rotational angle positions is a beat angle. The different gear ratio is selected such that beat angle periods are in an angular measuring range of the sensor and the absolute angular positions of the code wheels in the beat angle periods is different. The absolute angular positions of the code wheels in successive beat angle periods is offset by the nth part of the measuring range of a sensor element, where n is number of beat angle periods.

11 Claims, 3 Drawing Sheets

U.S. PATENT DOCUMENTS

| | | |
|---|---|---|
| 2003/0177649 A1 | 9/2003 | Ito et al. |
| 2004/0059486 A1 | 3/2004 | Takuma et al. |
| 2004/0257070 A1 | 12/2004 | Takuma |
| 2006/0032062 A1* | 2/2006 | Besier et al. ................ 33/1 PT |
| 2006/0042403 A1 | 3/2006 | Oike et al. |
| 2008/0005913 A1* | 1/2008 | Kachouh .................... 33/1 PT |

FOREIGN PATENT DOCUMENTS

| | | |
|---|---|---|
| DE | 103 43 543 A1 | 7/2004 |
| DE | 10 2004 029 249 A1 | 1/2005 |
| EP | 0 877 916 | 11/1998 |
| EP | 1 321 745 A1 | 6/2003 |
| EP | 1 536 217 A1 | 6/2005 |

* cited by examiner

ROTATION ANGLE SENSOR AND METHOD FOR DETERMINING THE ABSOLUTE ANGULAR POSITION OF A BODY UNDERGOES SEVERAL ROTATIONS

CROSS-REFERENCE TO RELATED APPLICATIONS

This is a continuation-in-part of International Application PCT/EP2007/001126, published in German, with an international filing date of Feb. 9, 2007, which claims priority to DE 10 2006 006 359.7, filed Feb. 11, 2006, the disclosures of which are both hereby incorporated by reference.

BACKGROUND OF THE INVENTION

1. Field of the Invention

The present invention relates to a rotational angle sensor for determining the absolute angular position of a body such as a vehicle steering shaft that can rotate through several rotations (i.e., rotatable by more than 360°) in which the sensor includes first and second measuring elements each having a magnet which rotates relative to a respective magnetic sensor element as the body rotates with the magnets being driven at different gear ratios such that the difference between the rotational angle positions of the magnets results in a "beat angle" in which more than one beat angle period is contained within the angular measuring range of the rotational angle sensor and the rotational angle position of the magnets in the beat angle periods is different.

2. Background Art

Rotational angle sensors determine the instantaneous rotational angle position of a rotatably supported body. For example, a steering angle sensor determines the absolute angular position of the steering shaft of a vehicle. Steering angle sensors may operate optoelectronically or magnetically.

An optoelectronic steering angle sensor includes a code disk in mechanical linkage with the shaft to rotate therewith. The code disk circumferentially surrounds and radially extends from the shaft. The code disk has a certain radial extension so that necessary angle coding information for enabling the sensor to determine the absolute angular position of the shaft within an angular measuring range extending over several revolutions can be accommodated on the code disk.

U.S. Pat. No. 5,930,905 (corresponding to EP 0 877 916 A1), which is hereby incorporated by reference, describes a magnetic steering angle sensor having a drive wheel and first and second code wheels. The drive wheel is connected to the shaft to rotate therewith and includes a gear ring. Each code wheel includes a gear ring and a magnet whose magnetic field orientation is a measure of the rotational angle position of the code wheel. First and second fixedly placed magneto-sensitive elements, such as GMR sensors, AMR sensors, or Hall effect sensors, respectively monitor the magnetization of the magnets to determine the rotational angle position of the code wheels. The gear rings of the code wheels engage with the gear ring of the drive wheel such that the code wheels rotate as the shaft rotates. The absolute angular position of the shaft within the angular measuring range of the steering angle sensor extending over several revolutions of the shaft is determined by application of the Nonius principle. In particular, the code wheels are driven at different gear ratios than the drive wheel and have a smaller number of teeth than the drive wheel. The gear reduction is such that one code wheel rotates 360° n times and the other code wheel rotates 360° n+1 times over the angular measuring range, where n is greater than the number of revolutions of the angular measuring range. For example, the first code wheel rotates nine times (i.e., 3240°) and the second code wheel rotates ten times (i.e., 3600°) over the angular measuring range which extends over four revolutions (i.e., 1440°) of the shaft. The difference between the rotational angle positions of the code wheels results in a "beat angle". The beat angle has a constant slope over the angular measuring range with the value of the beat angle at one end of the angular measuring range being 0 and the value of the beat angle at the other end of the angular measuring range being 360°. In order to determine the particular revolution of a code wheel, the beat angle is scaled and the rotational angle position associated with the code wheel is subtracted from the scaled beat angle. The scaling of the beat angle is such that subtracting the rotational angle position from the scaled beat angle results in individual horizontal plot segments, each of which defines an independent level. Each level defines one revolution of this code wheel so that the revolution information for determining the absolute angular position of the shaft may be obtained. A problem with the magnetic steering angle sensor is that magnetic interference results in a reduction of the effectively usable measuring range.

A plausibility check may be performed to verify the determined absolute angular position of the shaft. For example, the plausibility check involves the angle position of the vehicle wheels. The measurement accuracy of the wheel angle determination may be within the range of the angular error that occurs when an adjacent revolution is selected in error. This results in error in the angle determinations within the scope of the plausibility check of the determined absolute angular position.

U.S. Pat. No. 6,745,116 (corresponding to DE 103 43 543 B3), which is hereby incorporated by reference, describes a similar magnetic steering angle sensor. The angular measuring range of the sensor contains multiple beat angle periods with the cyclic periods of the two magnets being selected such that the smallest common multiple of the cyclic periods is equal to a predetermined steering angle of a vehicle. This results in very different drive ratios for the magnets and thus results in very different rotational speeds.

SUMMARY OF THE INVENTION

An object of the present invention includes a magnetic steering angle sensor for determining the absolute angular position of a vehicle steering shaft over an angular measuring range in which the sensor includes two measuring elements each having a magnet in which similar drive ratios are used for the magnets such that comparatively low rotational speeds may be achieved by the magnets.

An advantage of such a magnetic steering angle sensor is that its simplified design results in low noise generation and the ability to use an evaluation method that is relatively simple and relatively less susceptible to interference.

In carrying out the above objects and other objects, the present invention provides a sensor for determining the absolute angular position of a body that can rotate through a plurality of rotations. The sensor includes first and second code wheels each having a magnet. Each code wheel is connected to the body to rotate as the body rotates. The code wheels are driven at a different gear ratio such that the code wheels rotate at a faster rate than the body and such that the code wheels rotate at different rates from one another. The sensor further includes first and second magnetic sensor elements for respectively monitoring the rotational angle positions of the magnets of the code wheels to determine the rotational angle positions of the code wheels. The difference between rotational angle positions of the code wheels is a beat angle. The different gear ratio is selected such that more than one beat angle period is in an angular measuring range of the sensor and the absolute angular positions of the code wheels in the beat angle periods is different. The absolute angular positions of the code wheels in successive beat angle periods is offset by the nth part of the measuring range of one of the magnetic sensor elements, where n represents the number of beat angle periods within the angular measuring range of the sensor.

Further, in carrying out the above objects and other objects, the present invention provides a method for determining the absolute angular position of a body that can rotate through a plurality of rotations. The method includes connecting first and second code wheels to the body such that the code wheels rotate as the body rotates, wherein each code wheel includes a magnet. The method includes driving the code wheels at a different gear ratio such that the code wheels rotate at a faster rate than the body and such that the code wheels rotate at different rates from one another. The method includes monitoring the rotational angle positions of the magnets of the code wheels to determine the rotational angle positions of the code wheels using respective magnetic sensor elements. The method includes determining a beat angle as the difference between rotational angle positions of the code wheels. The method includes selecting the different gear ratio such that an angular measuring range of the body is divided into more than one beat angle period segment each containing a beat angle period. The method includes offsetting the absolute angular position of the code wheels in successive beat angle periods by the nth part of the measuring range of one of the magnetic sensor elements, where n represents the number of beat angle periods within the angular measuring range.

Also, in carrying out the above objects and other objects, the present invention provides a method and a rotation angle sensor for determining the absolute angular position of a body that undergoes several revolutions, such as a steering spindle of a vehicle. The sensor includes two measuring elements designed to operate magnetically. Each measuring element contains a magnetic pickup element which can rotate in relation to a sensor element and is driven by the body. To determine the suspension angle produced from the difference between the angular information of the pickup elements, the pickup elements are driven with a different step-up ratio. The step-up ratio is designed such that more than one suspension angle period is contained within the angular measuring range of the body, which extends over several revolutions, and the absolute angular position of the pickup elements differs in the suspension angle periods. The absolute angular position of the pickup elements in successive suspension angle periods is offset by an nth part of the measuring range of a sensor element, where n represents the number of suspension angle periods within the angular measuring range.

A magnetic steering angle sensor in accordance with embodiments of the present invention determines the absolute angular position of a vehicle steering shaft (i.e., a rotatable body) which is rotatable through several rotations (e.g., 1440°). As such, the sensor has an angular measuring range which corresponds to the range of available rotation of the shaft. The sensor includes first and second magnetically operated measuring elements. Each measuring element includes a magnet which rotates with the shaft to rotate relative to a respective magnetic sensor element. The sensor elements respectively monitor the magnetization of the magnets to determine the rotational angle positions of the magnets. The magnets are driven at different gear ratios such that the rotational angle positions of the magnets differ as the shaft rotates. This difference between the rotational angle positions of the magnets results in a "beat angle". The beat angle is indicative of the absolute angular position of the shaft. The sensor is designed such that more than one beat angle period is contained within the angular measuring range and the rotational angle positions of the magnets in the beat periods is different. The rotational angle positions of the magnets in successive beat angle periods is offset by the nth part of the measuring range of one of the sensor elements, where n represents the number of beat angle periods within the angular measuring range.

The differently geared drive of the magnets, which are supported by respective code wheels, is designed such that more than one beat angle period is contained within the angular measuring range. That is, the beat angle periods are periodically repeated several times within the angular measuring range. As a result of dividing the angular measuring range into several beat angle periods, the slope of the beat angle within each period, corresponding to the number of beat angle periods within the angular measuring range, is greater than for a single beat angle extending over the angular measuring range. As a direct result of the greater slope, the distance is correspondingly greater between levels which are formed by the scaled beat angle and are used for determining the revolutions. Dividing the angular measuring range into two successive beat angle periods results in a twofold increase in the slope of the beat angle in each period. The greater slope of the beat angle results in a decrease in the edge region of the angular measuring range, which cannot be evaluated due to interference signal effects, such that the entire angular measuring range is effectively preserved.

To be able to distinguish the revolutions of the magnets despite the at least partial repetition of the beat angle period within the angular measuring range, the rotational angle positions of the magnets in the beat angle periods are differentiated from one another. As a result, the distance between the directly adjacent levels used for determining revolutions is greater than the possible error tolerance of a vehicle wheel angle position used within a plausibility check for examining the absolute angular measurement determined by the sensor. Errors in the angle determinations due to a faulty plausibility check are thus avoided. For an angular measuring range having two beat angle periods, the offset is 180°, for example, assuming that the measuring range of a sensor element is 360°. This angular shift represents additional information from which the beat angle period may be determined.

To achieve the formation of the beat angle periods within the angular measuring range, a drive wheel having a gear ring is connected to the shaft and the code wheels supporting the magnets include gear rings. The gear rings are engaged with one another such that the drive wheel drives the code wheels with the magnets as the shaft rotates. Both code wheels are driven directly by the drive wheel or one code wheel is driven by the drive wheel and the other code wheel is driven by the one code wheel. The gear rings have a different number of teeth from one another with the gear ring of the drive wheel having more teeth than the gear ring of either code wheel. (For instance, the drive wheel has y teeth, one code wheel has m teeth, and the other code wheel has m+1 teeth, where y is greater than m+1.)

The difference in gear ratios of the code wheels of the sensor is greater than the difference in gear ratios of the code wheels of a typical magnetic steering angle sensor. This affords the opportunity of associating two different sizes of drive wheels having a correspondingly different number of teeth with the shaft. The diameter of the shaft is typically much larger than the diameter of either code wheel so that drive wheels having a different number of teeth may be easily provided. In one embodiment, the code wheels each have the same number of teeth, and the shaft supports two drive wheels, each having a different number of teeth. The difference in the number of teeth of the two drive wheels is between five and seven teeth. When two drive wheels having a different number of teeth are used, the code wheels themselves likewise may have different numbers of teeth.

The above features, other features, and advantages of the present invention are readily apparent from the following detailed descriptions thereof when taken in connection with the accompanying drawings.

DETAILED DESCRIPTION OF THE PREFERRED EMBODIMENT(S)

Figure 4A:
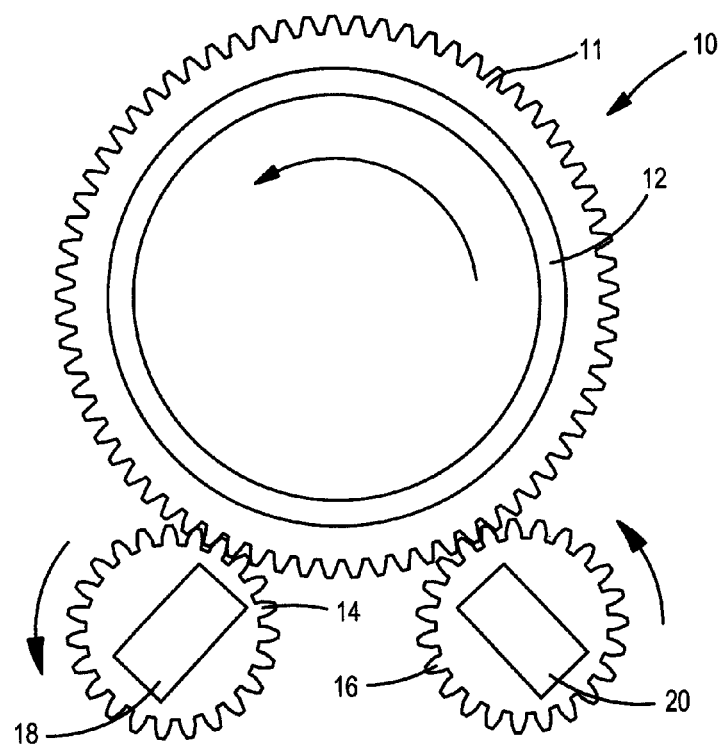
FIG. 4a illustrates a top view of the magnetic steering angle sensor in accordance with an embodiment of the present invention.
Figure 4B:
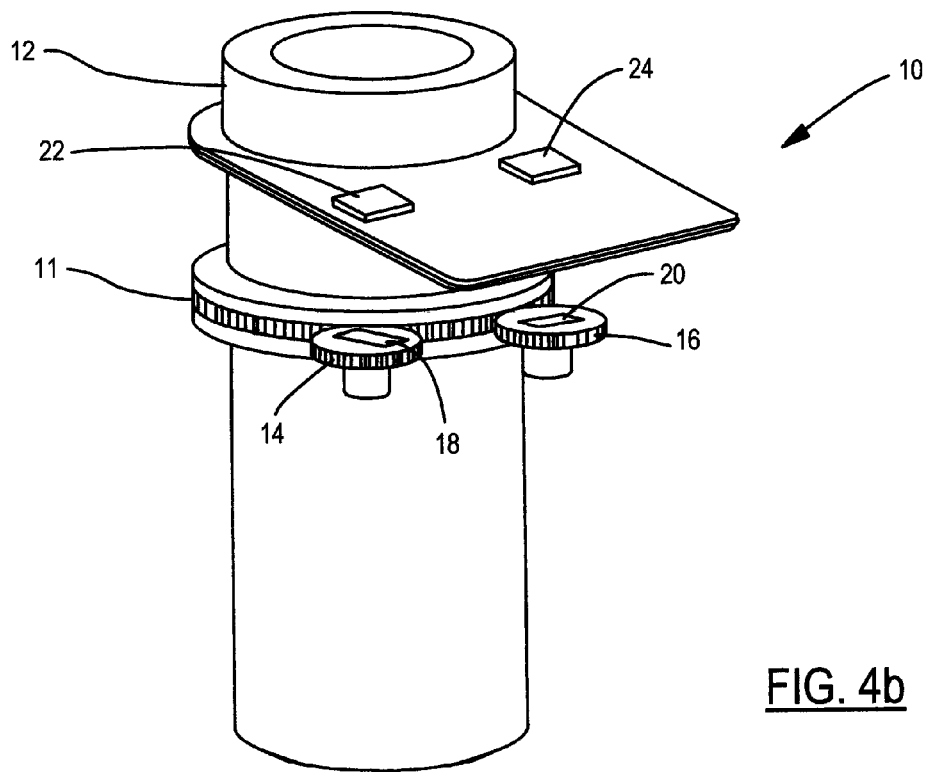
FIG. 4b illustrates an entire view of the magnetic steering angle sensor in accordance with an embodiment of the present invention.

Turning initially to FIGS. 4a and 4b, a magnetic steering angle sensor 10 in accordance with an embodiment of the present invention determines the absolute angular position of a rotatable body 12 (such as the steering shaft of a vehicle) which can rotate through several revolutions (e.g., 1800°). The sensor 10 determines the absolute angular position of the shaft 12 over an angular measuring range corresponding to the range of available rotation of the shaft. In this embodiment, as described in U.S. Pat. No. 5,930,905, which is hereby incorporated by reference, a drive wheel 11 engages the shaft 12 to rotate therewith and the sensor 10 includes first and second magnetically operated measuring elements. Each measuring element includes a respective code wheel 14, 16 having a respective magnet 18, 20 (i.e., a magnetic pickup element). The code wheels 14, 16 engage the drive wheel 11 (via a toothed gear ring of the drive wheel 11 and respective toothed gear rings of the code wheels as shown) such that the code wheels (and the magnets 18, 20 therein) rotate with the shaft 12 to rotate relative to a respective magnetic sensor element 22, 24 The sensor elements 22, 24 respectively monitor the magnetization of the magnets 18, 20 to determine the rotational angle positions of the code wheels 14, 16 (and the magnets 18, 20). The code wheels 14, 16 are driven at different gear ratios such that the rotational angle positions of the code wheels differ as the shaft 12 rotates. This difference between the rotational angle positions of the code wheels 14, 16 results in a "beat angle". The beat angle is indicative of the absolute angular position of the shaft 12.

The sensor is designed such that more than one beat angle period (e.g., first and second beat angle periods) is contained within the angular measuring range and the rotational angle positions of the code wheels in the beat angle periods is different. The rotational angle positions of the code wheels in successive beat angle periods is offset by the nth part of the measuring range of one of the sensor elements, where n represents the number of beat angle periods within the angular measuring range.

Figure 1:
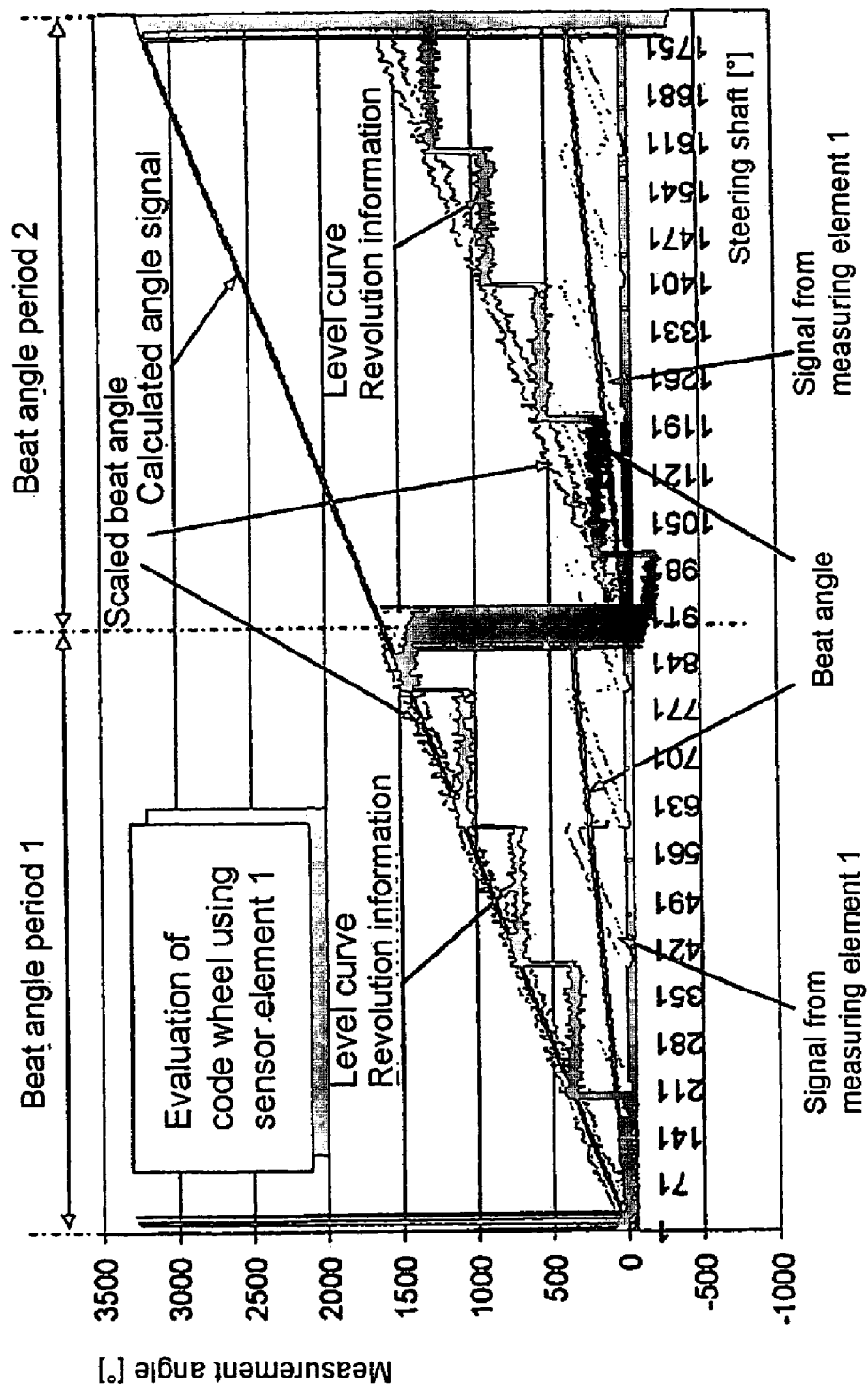
FIG. 1 illustrates a diagram showing the rotational angle position output for a code wheel of a magnetic steering angle sensor in accordance with an embodiment of the present invention in which the output is plotted with the beat angle periods extending over the angular measuring range of the sensor together with the revolution information concerning the code wheel determined from these plots.
Figure 2:
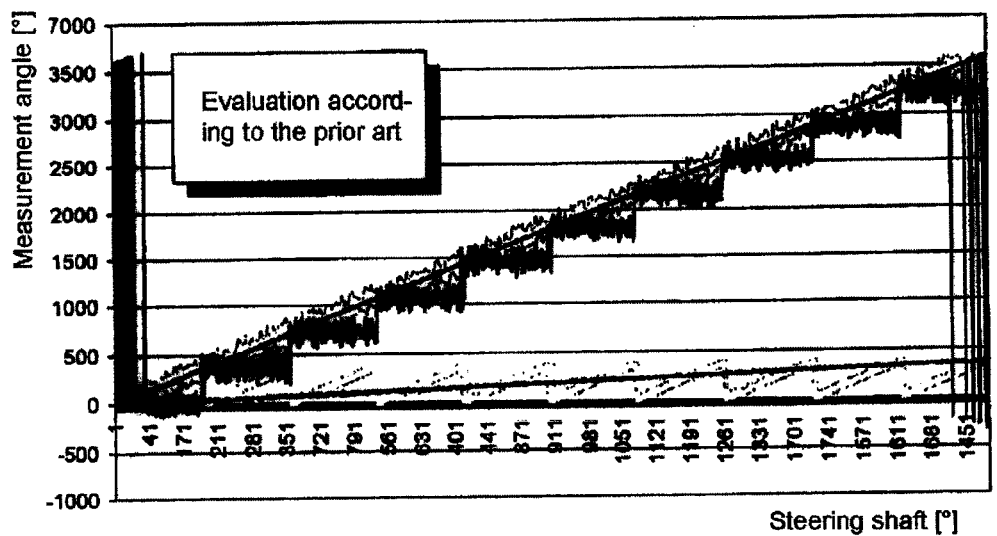
FIG. 2 illustrates a diagram corresponding to the diagram of FIG. 1 for a conventional magnetic steering angle sensor.

FIG. 1 illustrates a diagram showing the rotational angle position output for a first one of the code wheels of the sensor. FIG. 2 illustrates a diagram corresponding to the diagram of FIG. 1 which shows the rotational angle position for a code wheel of a conventional magnetic steering angle sensor. Each diagram contains several evaluation plots. In order to emphasize advantages of the sensor in accordance with the present invention, the signals in the diagrams are superimposed with interference signals. The detected signals are thus noisy interference signals.

In FIG. 1, the rotational angle position of the first code wheel, which is outputted from the sensor element associated with the first code wheel, is plotted with the beat angle periods extending over the angular measuring range together with the revolution information concerning the first code wheel determined from these plots. The angular measuring range, which extends over several revolutions of the shaft, is plotted on the X axis. In this example, the angular measuring range is five shaft revolutions (i.e., 0° to 1800°). The sensor is designed such that the first code wheel rotates nine times (i.e., 3240°) over the entire angular measuring range (i.e., the first code wheel rotates nine times when the shaft rotates five times). The rotational angle position output of the first code wheel results in the sawtooth-shaped plot ("Signal from measuring element 1") illustrated in the lower part of the diagram. As such, the angular position of the first code wheel may be unambiguously determined within each revolution.

The second code wheel is driven directly or indirectly by the shaft at a correspondingly different gear reduction such that two beat angle periods result within the angular measuring range. In this embodiment, the second code wheel rotates eleven times (i.e., 3960°) over the entire angular measuring range (i.e., the second code wheel rotates eleven times when the shaft rotates five times). The beat angle is formed by subtracting the rotational angle position of the first code wheel from the rotational angle position of the second code wheel. The beat angle ("Beat angle") has a constant slope in the two beat angle periods ("Beat angle period 1" and "Beat angle period 2") which are provided in this embodiment.

The beat angle is used to determine the revolution information concerning the first code wheel, whose measured plot is shown in FIG. 1, necessary for determining the absolute angular position of the shaft. The beat angle is scaled ("Scaled beat angle") for this purpose. The rotational angle position of the first code wheel is then subtracted from the scaled beat angle. This results in the stair-step plot ("Level curve revolution information") illustrated in the diagram of FIG. 1. Each individual horizontal segment of the stair-step plot is referred to as a "level". The beat angle is scaled in such a way that after subtraction of the rotational angle position of the first code wheel, the individual levels of the level plot have a horizontal extension, and thus have a constant y value over their length.

The levels are different in each beat angle period, thus allowing each revolution of the code wheel to be unambiguously determined. The jump height of adjoining levels, which is determined by the slope of the beat angle, is great enough that even faulty plausibility check results are not able to call into question the revolution results to the extent that these could be established on a directly adjoining level.

The diagram of FIG. 1 plots the calculated angle signal ("Calculated angle signal") which extends as a continuously ascending plot over the angular measuring range. It is seen that an unambiguous angular position of the shaft may be calculated at any rotational angular position of the code wheels as a function of their revolution.

The absolute angles of the two code wheels are shifted by one-half of the measuring range of a sensor element, resulting in a jump in the plot of the scaled beat angle and in the level plot. It is generally desirable to design the shift in the absolute angles of the two code wheels after each period of the beat angle so that the beat angle corresponds to the nth part of the measuring range of the sensor element, where n represents the number of beat angle periods within the angular measuring range. The levels directly adjoining the jump location define the same revolution of the code wheel. The unambiguous determination of each revolution of the code wheel likewise allows an unambiguous association of the angular position with the shaft regarding the particular revolution in which the shaft is located.

As described above, the evaluation diagram plotted in FIG. 1 is based on using a magnetic steering angle sensor in accordance with an embodiment of the present invention. The corresponding evaluation diagram plotted in FIG. 2 is based on using a conventional magnetic steering angle sensor. As shown in the diagram of FIG. 2, a much lower jump height is between adjoining levels. This jump height is only one half as high as that for the magnetic steering angle sensor in accordance with an embodiment of the present invention. As a result, the signal-to-noise ratio is much lower in the conventional magnetic steering angle sensor than in the sensor in accordance with the embodiment of the present invention.

Figure 3:
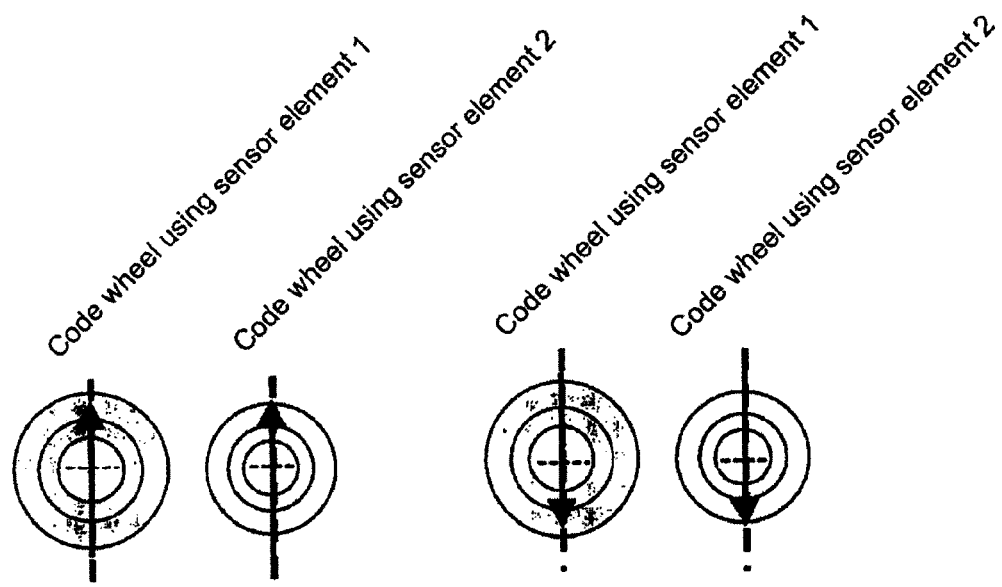
FIG. 3 illustrates the position of the two code wheels of the magnetic steering angle sensor in accordance with an embodiment of the present invention at the beginning of the first beat angle period (left side) and at the beginning of the subsequent second beat angle period (right side)

Referring now to FIG. 3, the absolute angular position of the two code wheels of the magnetic steering angle sensor in accordance with an embodiment of the present invention at the beginning of the first beat angle period (left side) and at the beginning of the subsequent second beat angle period (right side) are shown. That is, the left side of FIG. 3 illustrates the code wheels in the starting position of the first beat angle period and the right side of FIG. 3 illustrates the code wheels in the starting position of the second beat angle period (i.e., in the position after passing through the first beat angle period and thus directly behind the jump location at the beginning of the second beat angle period). The shift in the absolute angles of the code wheels in the two beat angle periods is referred to as the "offset". The offset is 180°, which is one-half of the measuring range of a sensor element.

The magnetic steering angle sensor in accordance with the present invention has been described with reference to an embodiment having two measuring elements. To increase the operational reliability or availability of the sensor through redundancy, the sensor may have more than two measuring elements.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A sensor for determining the absolute angular position of a body that can rotate through a plurality of rotations, the sensor comprising:

first and second code wheels each having a magnet, wherein each code wheel is connected to the body to rotate as the body rotates, wherein the code wheels are driven at a different gear ratio such that the code wheels rotate at a faster rate than the body and such that the code wheels rotate at different rates from one another; and first and second magnetic sensor elements for respectively monitoring the rotational angle positions of the magnets of the code wheels to determine the rotational angle positions of the code wheels, wherein the difference between rotational angle positions of the code wheels is a beat angle;

wherein the different gear ratio is selected such that more than one beat angle period is in an angular measuring range of the sensor and the absolute angular positions of the code wheels in the beat angle periods is different;

wherein the absolute angular positions of the code wheels in successive beat angle periods is offset by the nth part of the measuring range of one of the magnetic sensor elements, where n represents the number of beat angle periods within the angular measuring range of the sensor.

2. The sensor of claim 1 wherein:
at least two beat angle periods are in the angular measuring range of the sensor.

3. The sensor of claim 1 further comprising:
a drive wheel connected to the body to rotate as the body rotates;
wherein each code wheel engages the drive wheel such that the code wheels rotate as the body rotates.

4. The sensor of claim 3 wherein the drive wheel is a first drive wheel, the sensor further comprising:
a second drive wheel connected to the body to rotate as the body rotates;
wherein one of the code wheels engages the first drive wheel to rotate as the body rotates and the other code wheel engages the second drive wheel to rotate as the body rotates.

5. The sensor of claim 4 wherein:
each code wheel as a gear ring and each drive wheel has a gear ring, wherein the gear rings of the code wheels respectively engage the gear rings of the drive wheels such that the code wheels rotate as the body rotates.

6. The sensor of claim 5 wherein:
the gear rings have different numbers of teeth from one another.

7. The sensor of claim 1 wherein:
the drive wheel has a gear ring;
wherein each code wheel has a gear ring which engages the gear ring of the drive wheel such that the code wheels rotate as the body rotates.

8. The sensor of claim 7 wherein:
the gear rings of the code wheels and the drive wheel have different numbers of teeth with the gear ring of the drive wheel having more teeth than the gear rings of the code wheels and one of the code wheels having more teeth than the gear ring of the other code wheel.

9. The sensor of claim 1 wherein:
the body is the steering shaft of a vehicle.

10. A method for determining the absolute angular position of a body that can rotate through a plurality of rotations, the method comprising:
connecting first and second code wheels to the body such that the code wheels rotate as the body rotates, wherein each code wheel includes a magnet;

driving the code wheels at a different gear ratio such that the code wheels rotate at a faster rate than the body and such that the code wheels rotate at different rates from one another;

monitoring the rotational angle positions of the magnets of the code wheels to determine the rotational angle positions of the code wheels using respective magnetic sensor elements;

determining a beat angle as the difference between rotational angle positions of the code wheels;

selecting the different gear ratio such that an angular measuring range of the body is divided into more than one beat angle period segment each containing a beat angle period; and offsetting the absolute angular position of the code wheels in successive beat angle periods by the nth part of the measuring range of one of the magnetic sensor elements, where n represents the number of beat angle periods within the angular measuring range.

11. A method for determining the absolute angular position of a steering shaft of a vehicle that can rotate through a plurality of rotations, the method comprising:

connecting first and second code wheels to the steering shaft of a vehicle such that the code wheels rotate as the steering shaft rotates, wherein each code wheel includes a magnet;

driving the code wheels at a different gear ratio such that the code wheels rotate at a faster rate than the steering shaft and such that the code wheels rotate at different rates from one another;

monitoring the rotational angle positions of the magnets of the code wheels to determine the rotational angle positions of the code wheels using respective magnetic sensor elements;

determining a beat angle as the difference between rotational angle positions of the code wheels;

selecting the different gear ratio such that an angular measuring range of the steering shaft is divided into more than one beat angle period segment each containing a beat angle period; and offsetting the absolute angular position of the code wheels in successive beat angle periods by the nth part of the measuring range of one of the magnetic sensor elements, where n represents the number of beat angle periods within the angular measuring range.

* * * * *